United States Patent [19]

Daugherty et al.

[11] 4,172,984
[45] Oct. 30, 1979

[54] FLUIDLY COOLED FLAT PLATE NEUTRAL BUS

[75] Inventors: Roger H. Daugherty, Wilkinsburg; Roger L. Swensrud, Plum Borough; Michael R. Jugan, Duquesne, all of Pa.

[73] Assignee: Westinghouse Electric Corp., Pittsburgh, Pa.

[21] Appl. No.: 824,595

[22] Filed: Aug. 15, 1977

[51] Int. Cl.² .......................................... H02K 11/00
[52] U.S. Cl. ......................................... 310/71; 310/65
[58] Field of Search ................. 310/71, 57, 52, 64, 310/65, 58, 54; 174/16 B

[56] References Cited

U.S. PATENT DOCUMENTS

| 2,683,227 | 7/1954 | Beckwith | 310/64 |
| 2,742,582 | 4/1956 | Bahn | 310/52 |
| 2,742,583 | 4/1956 | Beckwith | 310/57 |
| 2,828,428 | 3/1958 | Baudry | 310/64 |
| 3,447,002 | 5/1969 | Rönnevig | 310/65 |
| 4,029,978 | 6/1977 | Jäger | 310/64 |

FOREIGN PATENT DOCUMENTS 652680 9/1964 Belgium ............................... 174/16 B

OTHER PUBLICATIONS

Bus-Bar Design for High-Freq. Induction Heating, J. W. Villiamson; Am. Inst. of El. Eng's; New York, Dec. 1951, AIEE Tech. Paper, pp. 52-68.

Primary Examiner—R. Skudy
Attorney, Agent, or Firm—J. W. Keen

[57] ABSTRACT

A fluidly cooled flat plate neutral bus for electrically connecting the neutral bushings on dynamoelectric machines. The current carrying flat plate is in heat transmissive contact with a coolant carrying conduit which transfers heat generated in the neutral bus to the coolant flowing therethrough. The fluidly cooled flat plate neutral bus provides high heat flux while occupying a small volume.

3 Claims, 8 Drawing Figures

FLUIDLY COOLED FLAT PLATE NEUTRAL BUS

BACKGROUND OF THE INVENTION

1. Field of the Invention:

This invention relates to the neutral bushings on dynamoelectric electric machines, and more particularly to means for electrically connecting those neutral bushings and means for cooling the electrically connecting means.

2. Description of the Prior Art:

Large turbine generators often have several (three for a three-phase machine) neutral lead bushings which are electrically connected by a bus. Several schemes have been utilized in the past to remove the heat generated in the bus as a result of the current flow therethrough during generator operation.

For some small generators satisfactory cooling of the bus was obtained by natural convection while larger machines required a forced convection air flow to maintain the bus at an acceptable temperature. More recently, buses on certain, selected generators were altered to accommodate still higher amperage ratings in those generators. These buses were typically water cooled members having rectangular cross sectioned copper current carriers within which stainless steel piping was brazed. Through the stainless steel piping or other suitable material coolant was transmitted which was effective in carrying away heat generated in the current carrier. This internally cooled neutral bus was acceptable for generators rated at less than 34,000 amperes. However, this design was no longer practical for a variety of reasons in machines whose ratings were larger than 34,000 amperes. Space limitations set by attachment requirements between the bus and the bushings prohibit additional coolant carrying pipes. Enlargement of the current carrier to accommodate an increased number of coolant carrying tubes would cause an increased cantilever type load to be imposed upon the attached neutral bushings. Such increased load could damage the bushings or adversely affect the performance of the entire generator. A neutral enclosure surrounds and isolates the neutral bushings and their connecting bus from the atmosphere. The purpose of the neutral enclosure is to prevent damage to and contamination of the bushings while shielding the electrically charged bushings and bus from any possible human contact. Any increase in the size of the rectangular current carrier bus must be reflected in a concomittant increase in the size of the neutral enclosure which surrounds that bus. Increasing the size of the neutral enclosure requires additional material and, more importantly, additional space in the power plant central station.

A further method for increasing the heat transfer rate from the neutral bus is to increase the coolant velocity through the stainless steel piping. However, for generator ratings higher than 34,000 amperes the required coolant velocity through the spatially limited maximum number of allowable stainless steel tubes becomes excessive resulting in possible tube erosion and drastically increased coolant pumping power. Such tube erosion can contaminate the nonconductive coolant and bring about forced turbine-generator outages while the excessive pumping power consumption can cause uneconomical operation.

It is thus apparent that a new design of bus is required which will increase the heat transfer capabilities and preferably decrease the space occupied by the old model bus.

SUMMARY OF THE INVENTION

In accordance with the present invention, an improved neutral bus is provided for electrically connecting the neutral bushings in dynamoelectric machines. This invention generally comprises an electrical winding which has internally cooled neutral bushings connected thereto, a multiple plate electrically conductive bus which is connected across those neutral bushings by flexible conductors disposed between the plates, and a plurality of coolant conduits attached to the plates for cooling the bus.

The conduits carry coolant therethrough and are joined to the plates in a heat conductive fashion. The coolant conduits are preferably joined to the bushing's internal coolant passages by flexible hoses. Further increases in generated heat from larger rated machines can be carried away by suitable selection of the number of conduits per bus plate member, size of the conduit, relative disposition of the conduit and plate member, and coolant velocity through each conduit. The weight and volumetric requirements of the present invention amount to 50% and 80% respectively of the previously utilized bus.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

The present invention is concerned primarily with connecting means for the neutral bushings of dynamoelectric machines and cooling means used for transferring heat from the connecting means. Accordingly, in the description which follows the invention is shown embodied in a large water cooled turbine generator. It should be understood, however, that the invention may be used as a neutral bushing connector in any dynamoelectric machine and also that the coolant utilized in the bus cooling means can be other than water.

Figure 1:
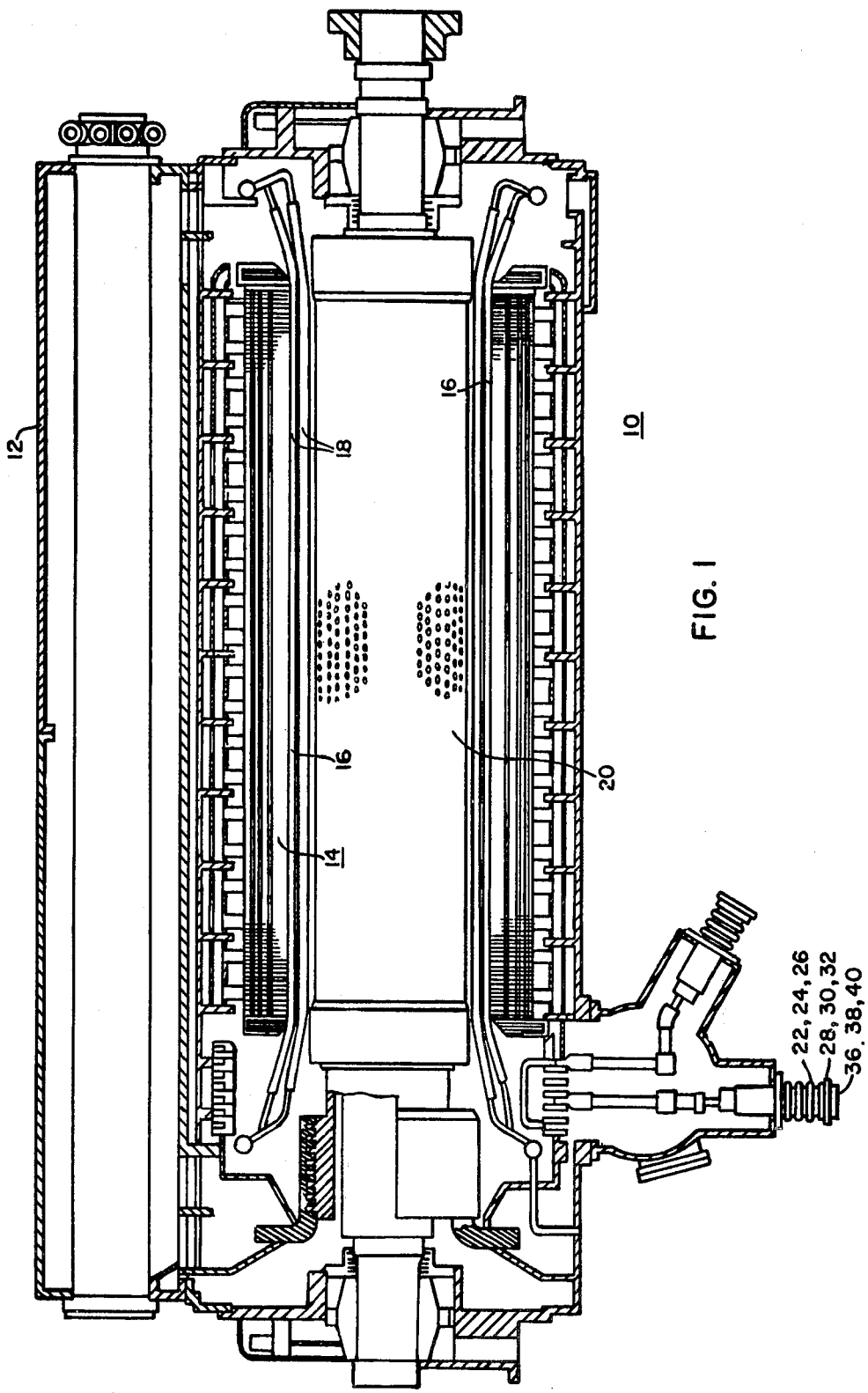
FIG. 1 is a transverse sectional view of a turbine generator in which the invention is incorporated.

In FIG. 1 the invention is shown, by way of illustration, disposed in operating position on a large turbine generator 10. The generator 10 is a three-phase machine of any rating with water cooled bushings.

As shown in FIG. 1, the generator 10 has an outer gas tight housing 12 filled with a coolant gas which is normally hydrogen. The generator 10 has a laminated stator core 14 of usual construction which is supported within the housing 12 in any suitable manner. The stator core 14 is provided with longitudinal slots 16 in the usual manner for the reception of high voltage stator winding coils 18. Generator 10 also has a rotor member 20 of any suitable type which is provided with a field winding (not shown). Neutral bushings 22, 24, and 26 receive their coolant supply within housing 12. That coolant is directed radially outward to the extremity of each bushing from which the coolant makes a turn and travels radially inward. During the course of the coolant's travel through the bushing, it absorbs heat from the bushing and is heat laden at its exit from the bushing.

Figure 3:
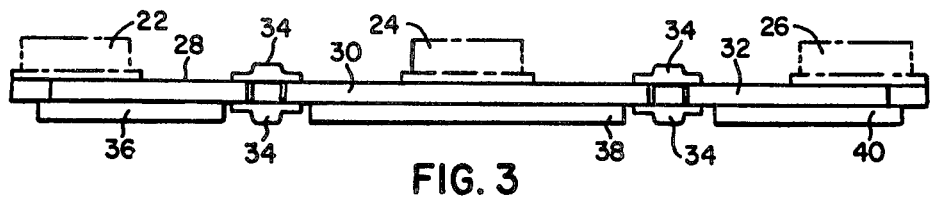
FIG. 3 is an elevation view of the invention taken 90° from FIG. 2.
Figure 2:
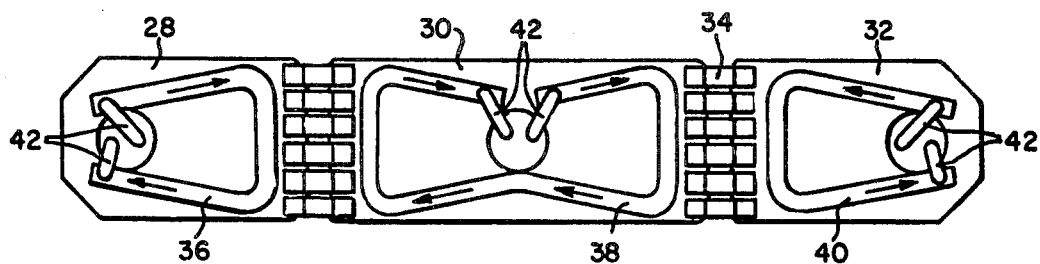
FIG. 2 is an elevation view of the present invention illustrating its connection with the neutral bushings.

FIGS. 2 and 3 illustrate the preferred embodiment of the present invention. Three separate plates 28, 30, and 32 are illustrated as being respectively connected with bushings 22, 24 and 26. Bus plate 28 is connected to bus plate 30 by a predetermined number of electrically conductive flexible connectors which are, preferably, braided wire straps. Current carrying requirements dictate the number and size of the previously mentioned flexible connectors. Bus plates 30 and 32 are similarly connected with the flexible connectors. Use of flexible connectors 34 in attaching the separate bus plates together have several advantages: easier handling characteristics during assembly than a single bus plate; larger allowable tolerances are permitted for the relative assembly position between each bushing and each bus plate since the bus plates may be electrically interconnected after assembly with the bushings; and removal and replacement of individual bus plates is facilitated by the easily connectible and disconnectible characteristics of flexible connectors 34. Additional design freedom can be obtained by using a double layer of flexible connectors 34 as illustrated in FIG. 3. Each bus plate is shown embodied as having a separate coolant conduit 36, 38 and 40. Each conduit is firmly attached to its respective bus plate to provide a heat conduction path of low resistivity. To aid in the formation of an effective heat transfer joint, square cross sectioned conduit, illustrated in FIG. 4B, is used. Any conduit, however, preferably having at least one flat side can be effectively utilized.

The coolant's disposition on the face of each bus plate can be optimized by actual testing to determine the most effective positioning for maximum heat transfer between the bus plate and the coolant flowing through the attached coolant conduit. Although not shown, it is to be understood that multiple layers of bus plate can be utilized with coolant conduit "sandwiched" between adjacent plates.

Flexible coolant hoses 42, preferably polytetrafluoroethylene, are illustrated as connecting the ends of each coolant conduit to the bushing coolant nipples (not shown). By making such connection the existing coolant supply may be utilized without resorting to additional external connections with the coolant conduits. The arrows shown in FIG. 2 indicate the direction of coolant flow through each of the coolant conduits 36, 38, and 40. No preference as to the direction of coolant flow is to be inferred from the arrows since the arrows are only used to show one possible direction of flow.

FIG. 3 shows the same elements of the present invention as does FIG. 2, but FIG. 3 is rotated 90° from the vantage point of FIG. 2. It is to be further understood that the neutral bushings illustrated in FIG. 1 can be pointed in any direction while still utilizing the present invention.

Figure 4A:
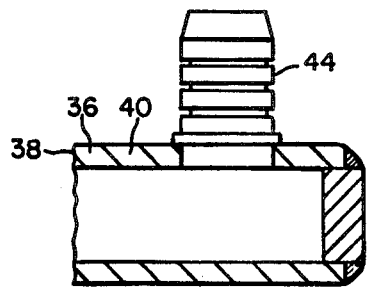
FIGS. 4A and 4B are elevation views taken 90° apart of a preferred embodiment coolant conduit which is shown utilized in FIGS. 1 through 3.
Figure 4B:
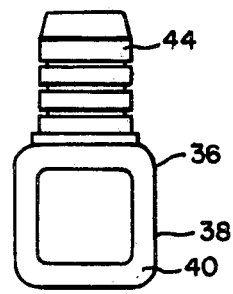

FIGS. 4A and 4B illustrate a sectional and elevation view respectively for a coolant conduit into which is brazed stainless steel nipple 44. Nipple 44 provides the entrance and exit terminal points for each coolant conduits connection through coolant hoses 42 to the neutral bushings.

By way of example, bus plates 28, 30, and 32 are made of material having a high electrical conductivity while coolant conduits 36, 38, and 40 are made from material having a high heat transfer conductivity. In the present case the materials of both elements, bus plate and coolant conduit, is copper. For neutral bushings which are located on 48" centerlines, bus plates of 17" in width and 1.25" in thickness are used with the length of each bus plate being chosen by referencing the bushing separation distances and using other design considerations. Coolant conduits 36, 38, and 40 have standard pipe wall thicknesses are 2" by 2" outside dimension. Joining coolant conduits 36, 38, and 40 to bus plates 28, 30, and 32 respectively is accomplished by brazing. Other suitable means of joining may be used to obtain the typically highly conductive (electrical and heat) joints attained by brazing.

Figure 5B:
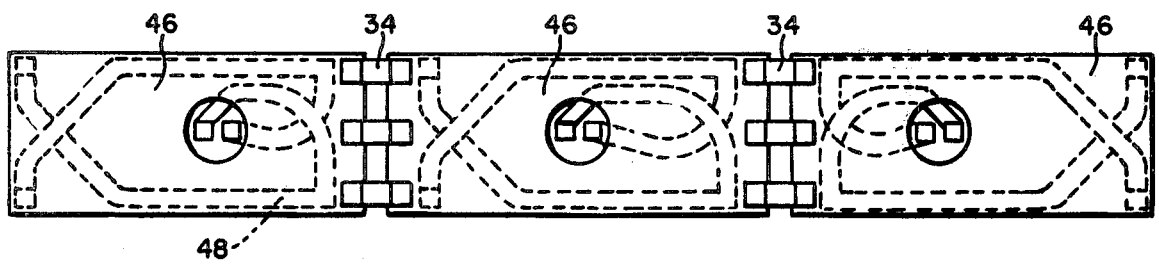
FIG. 5B is an elevation view of the prior art neutral bus.
Figure 5A:
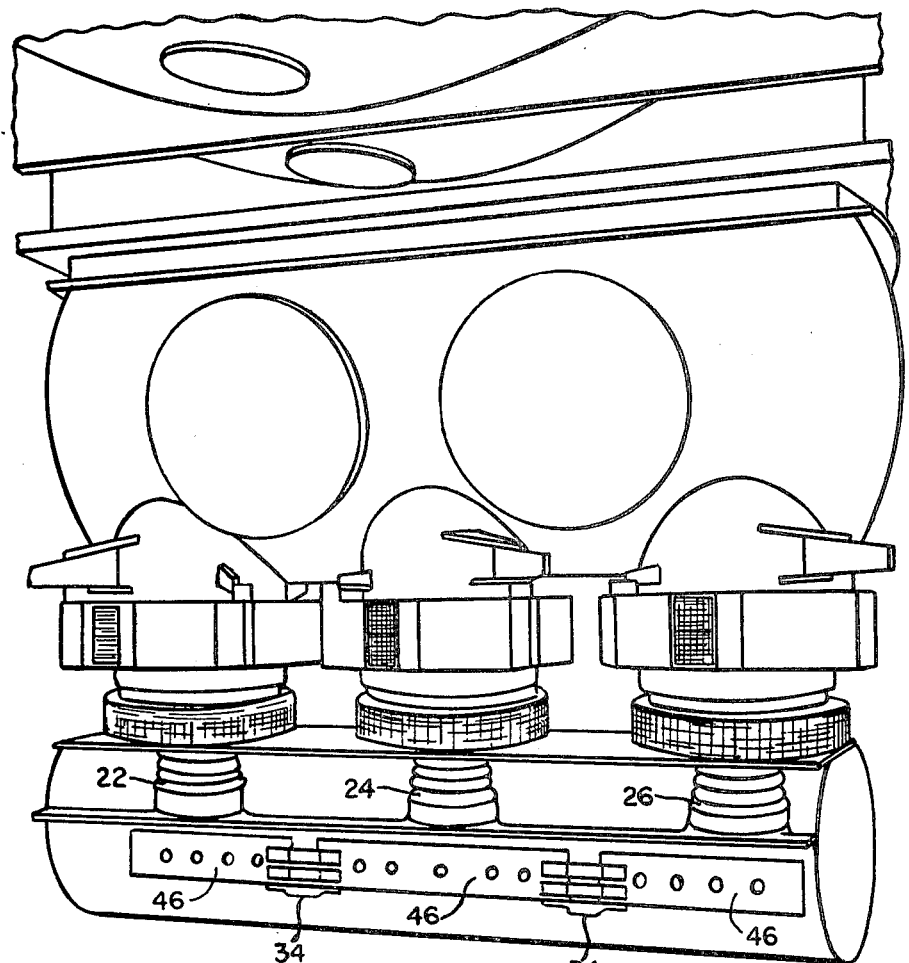
FIG. 5A is a pictorial view of the prior art neutral bus, the attached bushings, and its enclosure.

FIG. 5A is a pictorial illustration of a prior art neutral bus. Flexible connectors 34 are shown attached between the enclosed rectangular cross sectional bus sections 46, each of which is attached to a separate bushing.

Figure 5C:
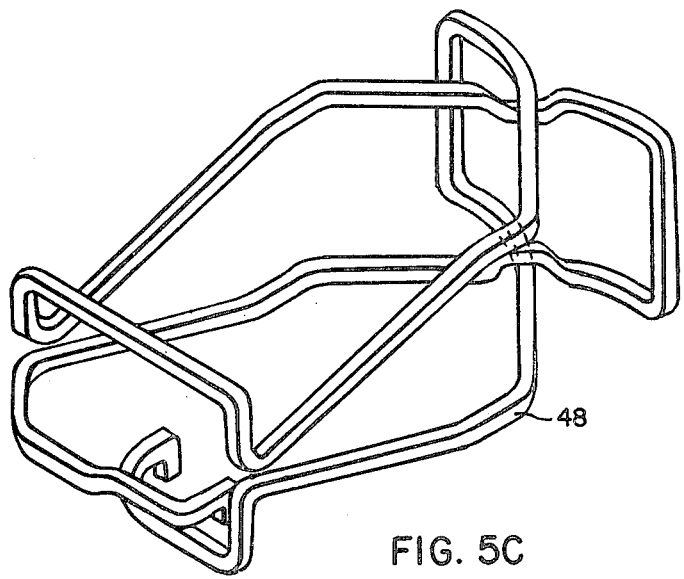
FIG. 5C is a pictorial view of the prior art coolant conduit.

FIG. 5B illustrates an elevation view of the prior art neutral bus and cooling system therefor. The complex shapes of the cooling conduits 48, better illustrated in FIG. 5C, used in cooling the attached rectangular-cross sectioned bus 46, necessitate an intricate fabrication procedure and a complicated assembly process into the bus. In FIG. 5C it can be seen that adding cooling conduits to the existing configuration or increasing the size of the existing conduits reduce access to the interior of the bus and result in increased difficulty in bolting the bus to the bushings.

It will now be apparent that an improved neutral bushing bus has been provided in which greater heat transfer is realized, smaller space is required, and greater assembly and disassembly freedoms exist. These features provide generators of higher rating, less space requirements, less material, and easier maintainability.

We claim:

1. A dynamoelectric machine comprising: an electrical winding having a plurality of neutral bushings which include internal coolant passages; an electrically conductive bus electrically connected across said neutral bushings, said bus comprising:
   a plurality of discrete plate members equal in number to the neutral bushings, each plate member being electrically connected to a corresponding bushing; and
   a series of flexible electrical connectors disposed between said plate members for electrically interconnecting said plate members; and
   a plurality of coolant conduits joined in heat transfer relationship to said plate members for passing coolant therethrough, each conduit being joined to a corresponding plate member.

2. The dynamoelectric machine of claim 1, further comprising: means for providing fluid communication between said neutral bushings, cooling passages and said coolant conduits, said fluid communication means having more flexibility than said coolant conduits.

3. The dynamoelectric machine of claim 2, wherein each of said coolant conduits is fluidly connected to its corresponding bushing's cooling passage.

* * * * *